United States Patent
Beckmann et al.

[11] Patent Number: 5,918,759
[45] Date of Patent: Jul. 6, 1999

[54] TANK OR SILO VESSEL MADE OF FIBER-REINFORCED PLASTIC

[75] Inventors: Jan-Dirk Beckmann, Winsen/Lube; Otto Feldbinder, Neuenkirchen, both of Germany

[73] Assignee: Apparate-und Chemieanlagenbau GmbH, Wittenberg, Germany

[21] Appl. No.: 09/000,249

[22] PCT Filed: Jul. 24, 1996

[86] PCT No.: PCT/EP96/03255

§ 371 Date: Jan. 27, 1998

§ 102(e) Date: Jan. 27, 1998

[87] PCT Pub. No.: WO97/04987

PCT Pub. Date: Feb. 13, 1997

[30] Foreign Application Priority Data

Jul. 27, 1995 [DE] Germany .............. 295 12 117

[51] Int. Cl.⁶ .............. B60P 3/22; B65D 90/02
[52] U.S. Cl. ............ 220/586; 220/62.19
[58] Field of Search ............ 220/586, 588, 220/589, 590, 591, 62.19

[56] References Cited

U.S. PATENT DOCUMENTS

| | | |
|---|---|---|
| 3,083,864 | 4/1963 | Young . |
| 3,335,904 | 8/1967 | Anderson . |
| 3,368,708 | 2/1968 | Pflederer . |
| 3,854,620 | 12/1974 | Saidla . |
| 4,123,307 | 10/1978 | Lemelson . |
| 4,344,543 | 8/1982 | Hoffman . |
| 4,557,968 | 12/1985 | Thornton et al. . |
| 4,783,232 | 11/1988 | Carbone et al. . |

FOREIGN PATENT DOCUMENTS

| | | |
|---|---|---|
| 6934133 | 8/1969 | Germany . |
| 7315702 | 7/1973 | Germany . |
| 7341620 | 7/1974 | Germany . |
| 2337914 | 2/1975 | Germany . |
| 2337919 | 2/1975 | Germany . |
| 2448875 | 9/1975 | Germany . |
| 7525643 | 3/1976 | Germany . |
| 2658111 | 7/1978 | Germany . |
| 8624157 | 4/1987 | Germany . |
| 3814699 | 12/1989 | Germany . |
| 9115518 | 8/1992 | Germany . |
| 4125524 | 2/1993 | Germany . |
| 4309832 | 1/1994 | Germany . |
| WO83/01924 | 6/1983 | WIPO . |
| WO92/09507 | 6/1992 | WIPO . |

OTHER PUBLICATIONS

"Tanklastzug mit Auflieger aus GFK geht in die Erprobung" in TÜ 20(1979), No. 4 Apr.

*Primary Examiner*—Joseph M. Moy
*Attorney, Agent, or Firm*—McCormick, Paulding & Huber

[57] ABSTRACT

The invention concerns a tank or silo vessel (10), in particular a vehicle-mounted vessel designed to hold liquid or other free-flowing goods, the elongated main body (12a) of the vessel having an essentially circular or elliptical or other cross section. The main body is closed off at each end by walls (12) which are conical, hemispherical or planar in shape, the main body (12a) and endwalls (12) enclosing a space (11) in the interior of the vessel. The vessel also has mountings (13) and pipe-connection facilities (14). In order to be able to produce the main body (12a), the end walls (12) and optionally also the mountings (13) and pipe-connection facilities (14) from fibre-reinforced plastic, the strength of the tank, in particular its resistance to temperature-related stresses, being higher than that of prior art tanks for the same or a lower weight, the invention proposes that the reinforcement fibres are embedded in the plastic in the form of filaments (16) or yarns continuously wound in a spiral round at least the main body (12a) of the tank.

12 Claims, 2 Drawing Sheets

TANK OR SILO VESSEL MADE OF FIBER-REINFORCED PLASTIC

AREA OF APPLICATION

The tank or silo container described here can be used in any situations that call for a container of this kind which offers greater stability, especially under thermic stress, and equivalent or lower weight than other containers constructed according to current techical standards.

The invention relates to tank or silo containers, especially for vehicles designed to carry liquid goods or goods capable of flowing, the lengthways main part of which has a circular, elliptical or other appropriate cross-section. The main part will be limited at both ends by walls spherical, hemispherical, or flat in shape, and the containers in question will have a receptacle formed by the main part and the wall sections together with stationary support and pumping hatches. Both the main part and the wall sections, and also the stationary support and pumping hatches if need be, will be made of fibre-reinforced plastics.

Current Technical Standards

Construction components have hitherto been manufactured from glass fibre- or carbon fibre-reinforced plastics for use in air, water and land vehicles. These components, which can be prefabricated as either surface or load-bearing components, are lightweight, have a fairly simple construction and are well-suited to series production.

Thus the use of construction components of this kind enables the manufacture of lightweight vehicle bodies that are able to accomodate heavy loads and withstand considerable stress.

Tank or silo containers for vehicles are manufactured from malleable alloys or steel, and here the thickness of the metal is fairly constant. This means that it is not possible to optimize the stability or load-bearing properties on a local basis. Moreover, containers of this kind have their own unladen weight, which reduces the payload.

For these reasons, tank or silo containers are also manufactured from glass fibre- or carbon fibre-reinforced plastics.

There are containers whose walls, stationary support and pumping hatches are made of fibre-reinforced plastics.

Here, the elements are made of plastic which is reinforced preferably with glass fibres, or, in order to achieve greater stability, with carbon fibres.

The construction consists of an inner layer with built-in fibres, an intermediate layer that is superimposed on the inner layer, and an outer layer superimposed on the intermediate layer which likewise contains built-in fibres: these can be either glass fibres or carbon fibres.

As a rule, the reinforcing fibres are chopped up before they are incorporated in the plastic; in exceptional cases, though, complete fibres or mats are used to form specific construction components, these being arranged in relation to the component concerned.

However, it has been shown that such fibre-reinforced containers tend to be defective, especially when subjected to thermic stress.

Purpose, Solution, Advantages

Thus it is the purpose of the invention to create a tank or silo container of this kind which offers greater stability, especially under thermic stress, and equivalent or lower weight than other containers constructed according to current techical standards.

This purpose is fulfilled by the features described in patent claim 1. The terms of the invention are to create a tank or silo container of this kind where the reinforcing fibres of an 'endless' thread are wound in a spiral at least around the main part and then embedded in the plastic.

Depending on their geometric shape, the wall sections should also preferably incorporate embedded threads wound in a spiral.

The threads consist of glass fibres and/or carbon fibres; if a mixture of both fibres is used, the ratio will be determined by the mechanical requirements.

Threads can also be combined to form cords, and the fibres can likewise be wound in several layers in order to produce any required wall thickness.

For the carbon fibres, materials will be used that are produced from various different fibre-forming organic substances such as cellulose, PAN, PF resins and the like; these materials must be incombustible and heat-resistant up to 2000° C.

For the plastic in which the fibres are embedded, resins, and in particular epoxy resins, will be used. Depending on the required use, other duroplastics and also thermoplastics of the types polyolefin, polyamide, polystyrol and polycarbon can be used.

When using thermoplastics, it is particularly advantageous that the properties of thermoplastics that are negative for this area of application when subject to thermic stress can be more than adequately compensated by the fibre reinforcement that forms part of the invention. Thus the suitability of polyolefins, for example, for transporting foodstuffs can be better utilised.

As far as epoxy resins are concerned, the resins made from epichlorhydrin and bisphenol A are preferred.

It also preferable for the stationary support and pumping hatches to be manufactured from fibre-reinforced plastic; here, the use of 'organic' shapes means that the glass fibre or carbon fibre threads can be embedded in the construction material, wound in a spiral according to the terms of the invention.

The use of a computer to support the fully automatic thread-wining process enables the winding process to be conducted without any trouble in such a way that the threads are wound in the direction of the main source of stress, and areas with increased mechanical stress are wound around more tightly; there should be no abrupt transitions in order to avoid material fatigue or tears caused by excess tension.

The silo or tank container will be manufactured according to the sandwich construction principle: an inner layer with embedded fibres has an intermediate layer superimposed on it for insulation purposes, preferably made of PUR, and this in turn is followed by an outer layer. The outer layer can likewise consist of a fibre-reinforced plastic. The stationary support and pumping hatches can also be constructed according to the sandwich principle.

For the production of a suitable container, it is planned to employ a special process where the inner layer is applied to a shaped body in such a way that the wound threads are embedded in a resin. After the resin has hardened, the isolation, preferably consisting of PUR, is applied and a surface layer is then added.

In order to achieve long-term stability and resilience, the terms of the invention provide for a surface coat of protective paint to be applied on top of the surface layer, with a view in particular to protecting the material from ultra-violet light.

In addition, the innermost layer will be equipped with a profile in order to provide the best possible adhesion.

The use of carbon fibres in the invention, linked to one another conductively over the entire surface of the container, is advantageous in preventing the build-up of static charges: this is important for the transport of certain hazardous goods such as non-halogenous hydrocarbons and gasoline. The electric charge is conducted through the bodywork and into the ground.

Overall, the use of a container in accordance with the terms of the invention provides the following advantages:

- It is possible to build a self-supporting structure without a continuous chassis.
- A significant weight saving is achieved by tailoring the form exactly according to the stress to which the container will be subjected.
- By using plastic constructed according to the sandwich principle, no heat or cold bridges are formed with the chassis or the accessories.
- The use of plastic as a construction material avoids the danger of an electrolytic charge building up (corrosion of precious into non-precious metals).
- In the thermally self-isolating sandwich construction, the interior of the container can be cleaned with hot water or steam, which is the usual method. Here, there is the added advantage that the hot water/steam dries out of its own accord without condensation forming. This brings cost benefits compared with cleaning methods that require separate drying.
- The composite material is easy to dye, and in the sandwich construction it is even possible to dye the inside a different colour from the outside.

Further advantages of containers constructed according to the terms of the invention are detailed in the sub-claims to this patent.

SHORT DESCRIPTION OF THE DRAWINGS

The drawings of the invention included at the end of this document show:

FIG. 1 A side view of a silo tanker-trailer with a silo container constructed according to to the terms of the invention.

FIG. 2 A rear view of a silo tanker-trailer.

FIG. 3 A cross-section of a container constructed according to to the terms of the invention.

DETAILED DESCRIPTION OF THE INVENTION AND BEST WAY OF EXECUTING IT

Figures 1, 2:
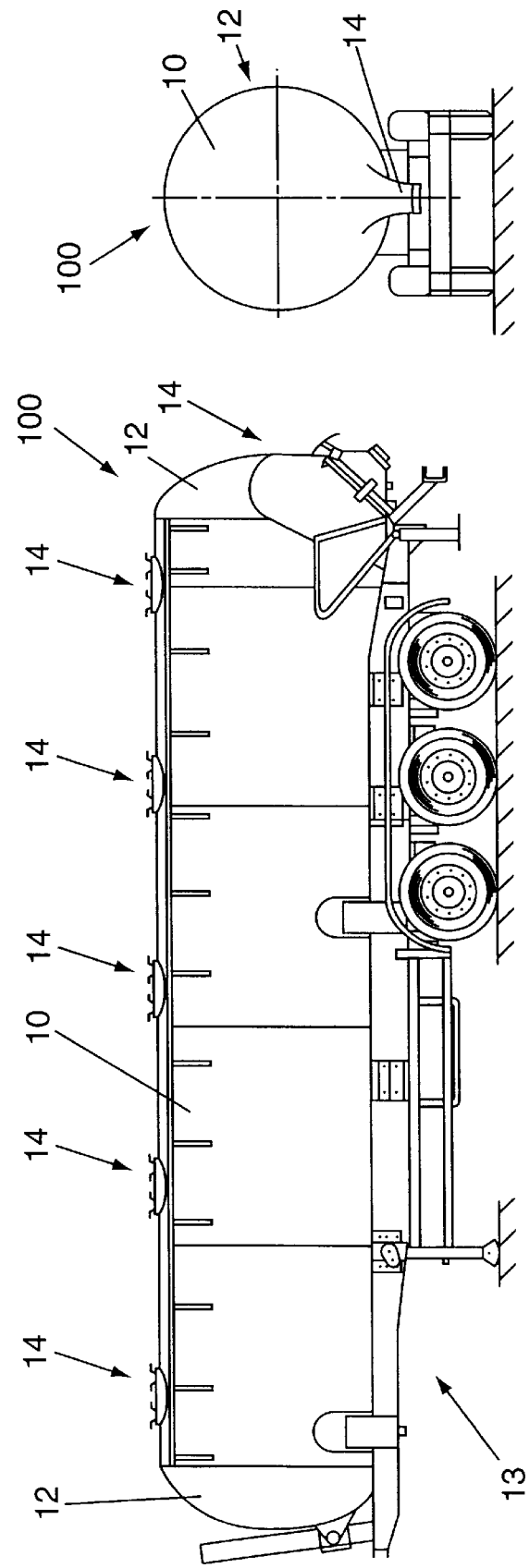

FIGS. 1 & 2 show a silo tanker-trailer (100) with a tank or silo container (10), the interior (11) of which is designed to hold liquids or goods in powder or granule form. The silo container (10) consists of geometric base forms such as cylinders, cones, spheres, flat surfaces etc. in combination with one another.

All the wall sections (12) and the main part (12a) of the container (10), as well as the stationary support (13) and pumping hatches (14), are made of fibre-reinforced plastic elements. The main part (12a) is of a closed hollow shape in transverse cross section and is limited at its two ends by the wall section (12).

Figure 3:
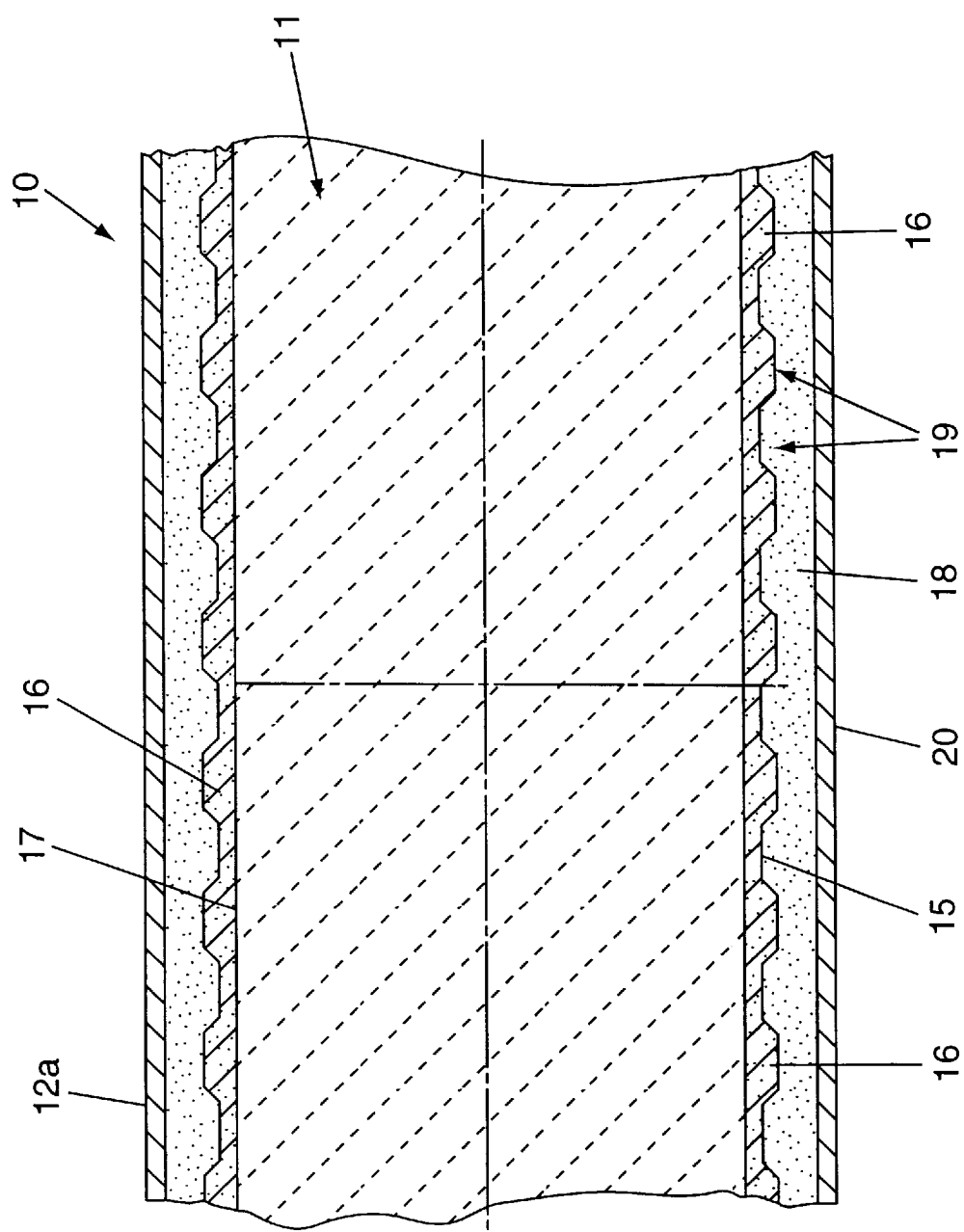

FIG. 3 shows a cross section of a silo container (10) constructed according to the sandwich principle. To build this superstructure and produce the container, a first inner layer (15) with spirally wound threads (16) is applied to a shaped model body not shown in this diagram. By applying this layer to the smooth surface of the model body, the container (10) receives an extremely smooth interior surface (17), which is particularly important for tank and silo containers. An intermediate layer (18) is then applied to the inner layer (15); this intermediate layer consists of foam material, e.g. PUR or another suitable material. The thickness of the intermediate layer (18) can vary according to constructive necessity: the intermediate layer (18) increases considerably the resistance of the component, but it also serves to fill empty spaces. The inner layer (15) is equipped throughout with a profile (19) which ensures that layers (15) and (18) adhere firmly to one another, and also functions as a reinforcing rib. The profile (19) can be formed by a mass of threads (16).

The insulating intermediate layer (18) is covered by an outer layer (20), to which a layer of paint or other protective layer can be applied.

The forms of the individual elements of the silo container (10) are only described by way of example above. The sandwich-type construction can have one or more fibre-reinforced plastic layers and one or more intermediate layers added to it in order to achieve the appropriate ration between the desired thickness and the desired load-bearing capacity of the component in question. Moreover, belts or weight-bearing elements can be incorporated into the plastic layers and/or into the intermediate layers to achieve a further, specific increase in the load-bearing capacity. There is also provision for the possible incorporation of elements in the intermediate layer on the side of the inside tank that can accomodate heat-conducting liquids for heating purposes, or electric heating mats or heating coils.

Key to Diagram Numbering

| | |
|---|---|
| Silo tank-trailer | 100 |
| Silo container | 10 |
| Inner receptable | 11 |
| Wall sections | 12 |
| Main part | 12a |
| Stationary support | 13 |
| Pumping hatches | 14 |
| First inner layer | 15 |
| Threads | 16 |
| Inside surface | 17 |
| Intermediate layer | 18 |
| Profile | 19 |
| Outer layer | 20 |

SUMMARY

Tank or Silo Container Made of Fibre-Reinforced Plastics

In order to manufacture a tank or silo container (10), especially for vehicles designed to carry liquid goods or goods capable of flowing, the lengthways main part of which (12a) has a circular, elliptical or other cross-section, where the main part will be limited by walls (12) spherical, hemispherical, or flat in shape, and the containers in question will have a receptacle formed by the main part (12a) and the wall sections (12) together with stationary support (13) and pumping hatches (14), and where both the main part (12a) and the wall sections (12), and also the stationary support (13) and pumping hatches (14) if need be, will be made of fibre-reinforced plastics, which offers greater stability, especially under thermic stress, and equivalent or lower weight than other containers constructed according to current techical standards, it is proposed that the reinforcing fibres be wound in thread form (16) in an endless spiral at least around the main part (12a) of the container and embedded in the plastic.

(FIG. 1)

What is claimed is:

1. A container (10) for use with a vehicle having a metal body work, said container comprising:

an elongated main part (12a) having a wall and a closed hollow shape in transverse cross section, said main part being limited by two end wall sections (12) to form an inner receptacle space (11), said wall of said main part (12a) being of a sandwich construction including an inner layer (15) made of reinforcing fibers embedded in a plastic, an intermediate layer (18) consisting of an insulating material, and an outer layer (20) covering said insulating material, with said outer layer being painted with a covering coat of paint, said reinforcing fibers of said inner layer (15) being in the form of threads (16) extending spirally of said main part and said plastic of said inner layer being one selected from the class consisting of polyolefin thermoplastic, polyamide thermoplastic, polystyrol thermoplastic, polycarbon thermoplastic and duroplastic, said inner layer (15) on the side facing said intermediate layer (18) having a profile shape formed mainly by a tighter winding of said threads (16) to create ribs extending spirally of said main part, and said threads (16) including at least some carbon fibre ones connected to one another in such a way as to conduct an electrical charge appearing at any place on said main part of said container from the container to the metal bodywork of the vehicle.

2. A container as defined in claim 1 wherein:

said reinforcing fibres are fibres selected from the class consisting of glass fibres and carbon fibres.

3. A container as defined in claim 1 wherein:

several of said threads are combined to form a cord.

4. A container as defined in claim 1 wherein:

said plastic is a duroplastic.

5. A container as defined in claim 4 wherein:

said duroplastic is an epoxy resin.

6. A container as defined in claim 1 wherein:

said insulating material is a polyurethane foam.

7. A container as defined in claim 1 wherein:

an accumulation of material consisting of several layers of threads (16) embedded in plastic is provided for in areas of the container subject to particular stress.

8. A container as defined in claim 1 wherein:

said outer layer (20) consists of a number of threads (16) of reinforcing fibres embedded in a plastic.

9. A container as defined in claim 1 wherein:

said outer layer (20) consists of an unreinforced plastic.

10. A container as defined in claim 1 wherein:

several layers of alternating fibre-reinforced plastic and foam are applied beneath the outer layer (20).

11. A tank or silo container as defined in claim 1 wherein:

said covering coat of paint is formed by a paint impermeable to UV light.

12. A container as defined in claim 1 wherein:

said container includes a stationary support (13) and pumping hatches, (14) which are reinforced by threads (16) made of fibres selected from the class consisting of glass fibres and carbon fibres embedded in a plastic.

* * * * *